United States Patent [19]
Matsumura et al.

[11] Patent Number: 6,047,495
[45] Date of Patent: *Apr. 11, 2000

[54] PEST-CONTROLLING APPARATUS FOR USE IN LIVESTOCK BARNS

[75] Inventors: Syunji Matsumura, Niihama; Isao Takada, Oyama; Toshiaki Mima, Ohmiya; Kazuo Fukui, Kawachi-machi, all of Japan

[73] Assignee: Novartis Corporation, New York, N.Y.

[ * ] Notice: Under 35 U.S.C. 154(b), the term of this patent shall be extended for 407 days.

[21] Appl. No.: 08/750,625

[22] PCT Filed: Jun. 8, 1995

[86] PCT No.: PCT/IB95/00451

§ 371 Date: Dec. 11, 1996

§ 102(e) Date: Dec. 11, 1996

[87] PCT Pub. No.: WO95/34198

PCT Pub. Date: Dec. 21, 1995

[30] Foreign Application Priority Data

Jun. 14, 1994 [JP] Japan ................................. 6-132144

[51] Int. Cl.[7] .................................................. A01M 7/00
[52] U.S. Cl. ............................. 43/124; 43/900; 239/112; 239/209; 239/302; 239/536; 239/567
[58] Field of Search ...................... 43/124, 900; 239/112, 239/208, 209, 302, 536, 566, 567

[56] References Cited

U.S. PATENT DOCUMENTS

| | | | |
|---|---|---|---|
| 870,766 | 11/1907 | Eaton | 43/900 |
| 876,631 | 1/1908 | Goff | 43/900 |
| 912,966 | 2/1909 | Lamiell et al. | 43/900 |
| 963,354 | 7/1910 | Braemer | 43/900 |
| 987,433 | 3/1911 | Crawford | 43/900 |
| 1,055,289 | 3/1913 | Nolan | 43/900 |
| 1,824,563 | 9/1931 | O'Connor | 239/209 |
| 1,936,732 | 11/1933 | Renard | 239/209 |
| 2,814,529 | 11/1957 | Arnt | 239/566 |
| 2,981,025 | 4/1961 | Woodson | 43/124 |

(List continued on next page.)

FOREIGN PATENT DOCUMENTS

| | | | |
|---|---|---|---|
| 3312268 | 10/1984 | Germany | 239/112 |
| 403290140 | 12/1991 | Japan | 43/124 |
| 4156967 | 5/1992 | Japan | 239/112 |
| 4341138 | 11/1992 | Japan | 43/124 |
| 5064534 | 3/1993 | Japan | 43/900 |
| 762826 | 9/1980 | U.S.S.R. | 43/900 |
| 793544 | 1/1981 | U.S.S.R. | 43/900 |
| 793545 | 1/1981 | U.S.S.R. | 43/900 |
| 1271471 | 11/1986 | U.S.S.R. | 43/900 |
| 1271472 | 11/1986 | U.S.S.R. | 43/900 |
| 1739938 | 6/1992 | U.S.S.R. | 43/900 |
| 1811910 | 4/1993 | U.S.S.R. | 239/209 |
| WO 81/00954 | 4/1981 | WIPO | 239/209 |

Primary Examiner—Michael J. Carone
Assistant Examiner—Darren Ark
Attorney, Agent, or Firm—Gabriel Lopez; Norbert Gruenfeld

[57] ABSTRACT

Spraying tubes (20 . . . ) through each of which a plurality of spraying holes are perforated along the longitudinal axis of each tube are placed in prescribed positions upper than feces boards (10 . . . ) of henhouses; and the spraying tubes (20 . . . ) are connected to agent-supplying means for supplying an agent such as a tank, a pump, etc. and airsupplying means for supplying compressed air such as a compressor, etc. The spraying holes make an angle not smaller than 5 degrees and not greater than 90 degrees as measured downward from the horizontal plane at the time of spraying an agent, in order to make it possible to spray the agent to feces boards (10 . . . ) and feces floor (12). The eggs of pests such as housefly and the like laid on the feces adhering to the feces boards and feces floor can efficiently and certainly be controlled. Since compressed air is supplied to the spraying tubes, no residual agent remains in the spraying tubes and the agent can be used up effectively, and at the same time the spraying tubes can be prevented from, the clogging caused by the agent.

3 Claims, 5 Drawing Sheets

U.S. PATENT DOCUMENTS

| | | | |
|---|---|---|---|
| 2,994,482 | 8/1961 | Valois et al. | 239/566 |
| 3,182,669 | 5/1965 | Campbell et al. | 239/567 |
| 3,373,762 | 3/1968 | Korchak | 239/112 |
| 3,513,586 | 5/1970 | Meyer et al. | 43/124 |
| 3,614,841 | 10/1971 | Query | 43/124 |
| 3,831,681 | 8/1974 | Livingston | 239/209 |
| 3,889,881 | 6/1975 | Cunningham et al. | 239/208 |
| 4,028,841 | 6/1977 | Lundwall | 43/124 |
| 4,161,198 | 7/1979 | Sojka . | |
| 4,204,977 | 5/1980 | Zwirlein | 239/112 |
| 4,343,719 | 8/1982 | Stevens et al. | 43/900 |
| 4,529,127 | 7/1985 | Huszagh | 239/112 |
| 4,549,676 | 10/1985 | Gerich | 239/112 |
| 4,714,179 | 12/1987 | Otterstetter et al. | 239/112 |
| 4,742,641 | 5/1988 | Cretti | 43/124 |
| 4,809,744 | 3/1989 | Bhat | 239/566 |
| 4,858,375 | 8/1989 | Mountain | 43/124 |
| 5,058,610 | 10/1991 | Kuriyama | 239/112 |
| 5,063,706 | 11/1991 | Aki et al. | 43/124 |
| 5,317,831 | 6/1994 | Fletscher | 43/124 |
| 5,394,642 | 3/1995 | Takaoka | 43/900 |
| 5,489,066 | 2/1996 | Oldham | 43/900 |

PEST-CONTROLLING APPARATUS FOR USE IN LIVESTOCK BARNS

TITLE OF THE INVENTION

The present invention relates to a pest-controlling apparatus for use in livestock barns which is placed in a livestock barn such as henhouse, pig house, cow shed and the like to control pests such as housefly and the like by spraying an agent to the feces of livestock.

In henhouses for raising hens for the purpose of ovum recovery, as many hens for ovum collection (hereinafter simply referred to as hens) as 4–5 heads have hitherto been raised in one cage or in a narrow place for the purpose of improving the efficiency of egg production. The henhouse is usually constructed according to the style of chick type multistage windowless henhouse in which one henhouse is constructed by stage-wise superposing the above-mentioned cages in 4–5 stages and arranging the stage-like structure thus obtained side by side in the lateral direction to make one row having a width of several tens of meters, although the structure may vary depending on the scale of the poultry farm. In this type of henhouse, a cage cover sheet (hereinafter referred to as feces board) is placed in a prescribed position of a henhouse of lower stage in order to appropriately lead the feces excreted by the hens of upper stage and thereby protect the hens of lower stage from the feces of the hens of upper stage.

In this type of poultry farm, a great importance is attached to the control of pests such as housefly and the like in order to prevent various diseases, in addition to a strict control of the raising conditions such as quality and quantity of feed, intensity of illumination, temperature, humidity, etc. Since the pests lay eggs mainly on the feces accumulating on the floor (the layer of accumulated feces is hereinafter referred to as feces floor), a pest-controlling agent has hitherto been sprayed onto the feces floor by the method mentioned below to prevent the occurrence of pests.

Figure 6A:
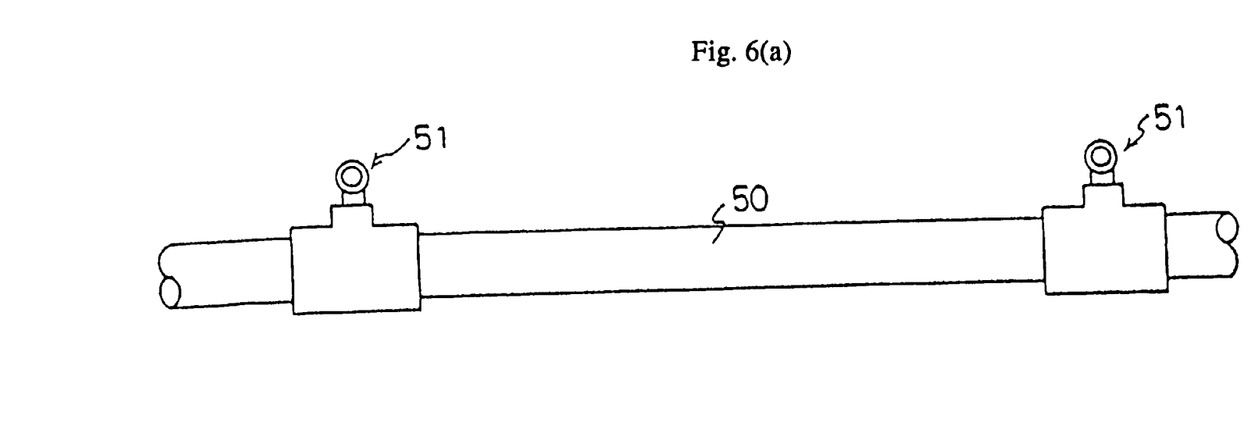
FIG. 6(a) is a side view of a prior art pest-controlling tube for use in livestock barns.
Figure 6B:
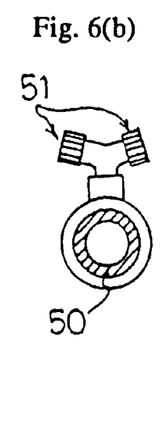
FIG. 6(b) is a sectional view thereof.

Thus, in a henhouse of small scale, pests are controlled by directly scattering an agent to the feces floor or spraying an aqueous dilution of the agent to the feces floor by means of a watering pot, a shouldered power-driven spray or the like. In a large-scale henhouse, as shown in FIGS. 6(a) and 6(b), a spraying tube 50 which is a pest-controlling tube for use in livestock barns,made of polyvinyl chloride, stainless steel or the like and provided with nozzles 51—at prescribed intervals, is appropriately placed in a prescribed position for the floor, and an aqueous solution of controlling agent is sprayed from the nozzles 51—onto the feces floor to control pests.

The prior controlling methods mentioned above, however, have the following problems, respectively. Thus, the method of directly scattering an agent to the feces floor or spraying an aqueous solution of agent onto the feces floor by means of a watering pot or power-driven spray is disadvantageous in that the controlling agent cannot be scattered on the feces floor uniformly and the spraying area per unit time is limited, that the controlling agent or its aqueous solution and the power-driven spray which are all heavy in weight must be directly carried into the henhouse and transported on the shoulder by working staffs during the spraying work, that the spraying work must be done under difficult conditions such as slippiness of floor, soiling of clothes, unpleasant odor, etc., and that the spraying work takes a long period of time.

Although the method of spraying an aqueous solution of controlling agent onto the feces floor from the nozzles 51—provided on spraying tube 50 can broaden the spraying area per unit time, this method is disadvantageous in that the nozzles 51—are readily clogged by feces because the spraying tube is placed on the floor, and therefore maintenance of nozzles 51—must be repeated frequently which elevates the maintenance cost, that the agent cannot be sprayed uniformly because the feces floor bulges out as the quantity of feces increases, and that a portion of the controlling agent remains in the spraying tube 50 due to which the consumption of controlling agent is greater than its quantity just necessary for the spraying.

Further, all the above-mentioned prior controlling methods are disadvantageous in that, since the agent is sprayed onto the feces floor, the pest eggs laid on the feces boards attached to a prescribed portion of the cage cannot be killed, even though the eggs laid on the feces floor may be killed by it. Accordingly, the prior controlling methods mentioned above are unable to control pests efficiently with certainty.

In the case of large-scale henhouses, a controlling method using a power-driven spraying apparatus constituted of an external tank-pump system and a pressure-resistant hose made of synthetic rubber or the like is also adopted. In this case, a working staff must step into the henhouse while carrying the nozzle attached to the tip of hose, in order to spray a controlling agent to feces boards and feces floor.

According to the prior controlling method using a power-driven spraying apparatus mentioned above, however, the working staff must spray the agent while dragging and conducting the pressure-resistant horse. Further, since the feces boards are placed in the henhouse so as to face each other, the spraying of the agent to the feces boards can be done only after stepping into inner parts of a henhouse. Thus, the controlling agent is difficult to spray uniformly, and the work must be done under difficult conditions like in the above-mentioned method using a watering pot or power spray.

The present invention has been made in view of the above-mentioned problems in the prior art. The object of the present invention is to provide a pest-controlling apparatus for use in livestock barns with which an agent can be sprayed onto a desired part of a livestock barn uniformly and certainly and pests can be controlled efficiently and certainly.

SUMMARY OF THE INVENTION

For solving the problems mentioned above, the pest-controlling apparatus according to the invention is a pest-controlling apparatus for use in livestock barns which is placed in a livestock barn and controls pests by spraying an agent to the feces of livestock. The apparatus is characterized by placing spraying tubes through each of which a plurality of spraying holes are perforated along the longitudinal axis of each tube in prescribed positions of the livestock barn and providing the spraying tubes with agent-supplying means for supplying a controlling agent to the spraying tubes and air-supplying means for supplying compressed air to the spraying tubes.

In order to solve the problems mentioned above, the pest-controlling apparatus according to the invention is a pest-controlling apparatus for use in livestock barns which is placed in a chick type multistage windowless henhouse and controls pests by spraying a controlling agent onto the feces of hens. The apparatus is characterized by placing spraying tubes through each of which a plurality of spraying holes are perforated along the longitudinal axis of each tube in positions higher than the cage cover sheet of the henhouse and providing the spraying tubes with agent-supplying means for supplying a controlling agent to the spraying tubes.

In order to solve the problems mentioned above, the pest-controlling apparatus according to the invention is a pest-controlling apparatus for use in livestock barns, wherein not less than 10 and not more than 60 spraying holes are perforated per meter length of spraying tube, the spraying holes have a diameter of not smaller than 0.1 mm and not greater than 0.4 mm, and the spraying holes make, at the time of spraying an agent, an angle of not smaller than 5 degrees and not greater than 90 degrees as measured downward from the horizontal plane.

Spraying tubes through each of which a plurality of spraying holes are perforated along the longitudinal axis of the tube are placed in prescribed positions of the livestock barn, and each of the spraying tubes is connected to agent-supplying means for supplying a controlling agent and air-supplying means for supplying compressed air.

This construction makes it possible to spray a controlling agent onto a desired part of a livestock barn uniformly and certainly and thereby to control pests efficiently and certainly. Further, since compressed air is fed into the spraying tube, no residual agent remains in the spraying tube and the agent can be used effectively, and at the same time clogging of spraying holes formed in the spraying tube by the agent can be prevented.

Spraying tubes through each of which a plurality of spraying holes are perforated along the longitudinal axis of each tube are placed in prescribed positions higher than the cage cover sheet of the henhouse, and the spraying tubes are connected to agent-supplying means for supplying a controlling agent.

This construction makes it possible to spray the controlling agent uniformly and certainly onto the desired parts of the henhouse such as cage cover sheet, etc. and thereby to control pests efficiently and certainly.

The spraying tube is provided with not less than 10 and not more than 60 spraying holes per meter length of the tube, and the spraying holes have a diameter of not smaller than 0.1 mm and not larger than 0.4 mm, and the spraying holes make, at the time of spraying an agent, an angle of not smaller than 5 degrees and not greater than 90 degrees as measured downward from the horizontal plane.

This makes it possible to spray an appropriate quantity of the controlling agent further uniformly and certainly onto the desired parts of a henhouse, such as cage cover sheet, etc.

Next, one embodiment of the present invention will be explained by referring to FIG. 1 to FIG. 5. In this embodiment, a pest-controlling apparatus for use in livestock barns is placed in a henhouse.

Figure 1:
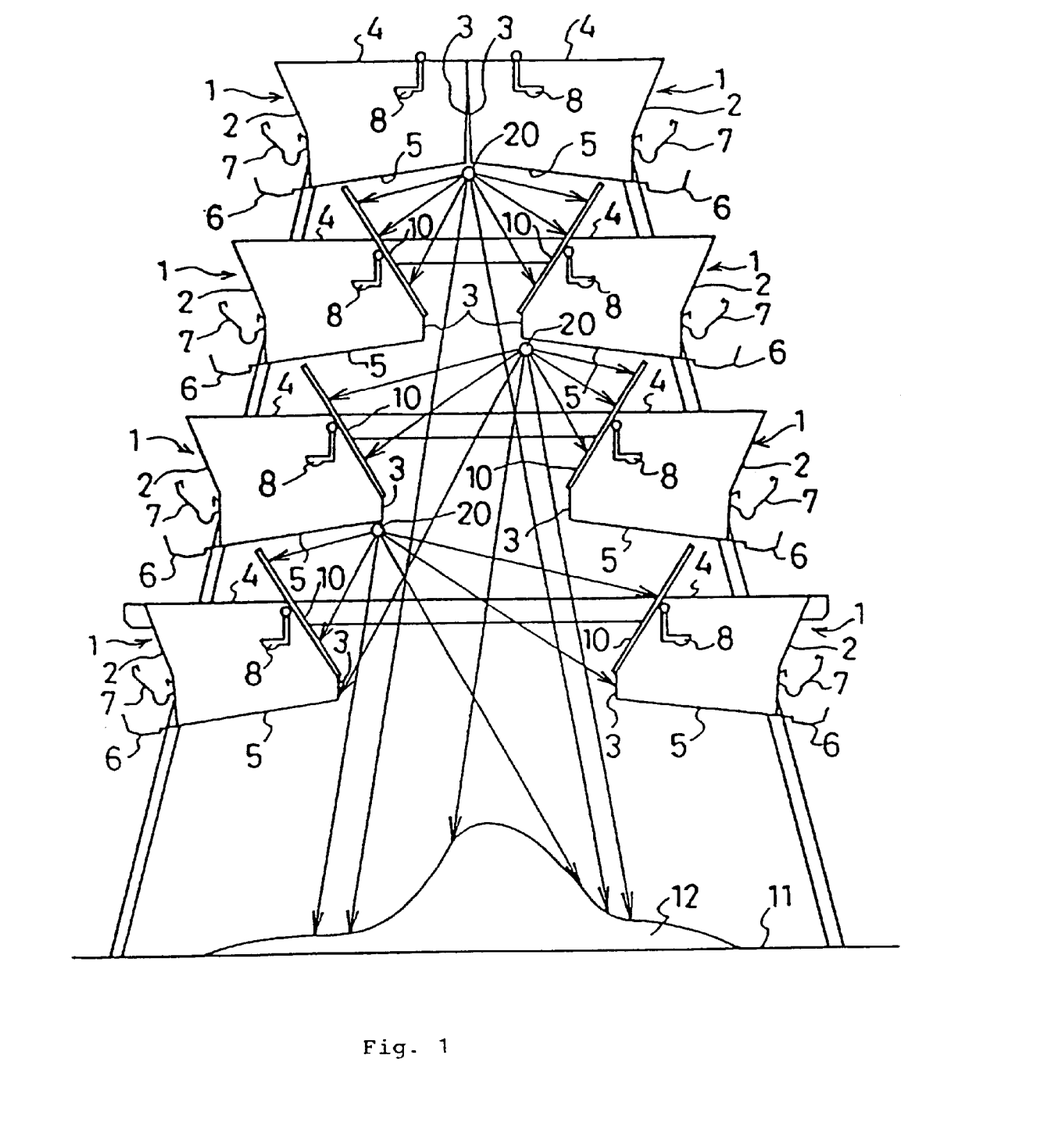
FIG. 1 is an outlined side view of a henhouse equipped with a pest-controlling apparatus for use in livestock barns.

As shown in FIG. 1, the henhouse provided with the pest-controlling apparatus of the present embodiment is constructed by placing two cages (1) for hens for ovum collection (hereinafter simply referred to as cages) containing hens for ovum collection (hereinafter simply referred to as hens, not shown in the figure) side by side to form one stage, followed by superposing four stages down to up to make one unit, and arranging such units laterally, namely perpendicularly to the paper surface, in a number ranging from several tens to several hundreds to form one henhouse. The overall width of one henhouse is about several tens of meters. This type of henhouse is generally called a chick type multistage windowless henhouse, in which one cage 1 contains four to five heads of hens in order to,raise many hens in a narrow space and thereby to enhance the efficiency of egg production.

Each cage 1 is made of, for example, a lattice-wise netted stainless steel wire gauze, and the plurality of cages 1 are connected to one another efficiently by sharing their side walls. In cage 1, the front side 2 forms a lattice-like structure out of which hens can stick only their head and cannot put their body, while the side walls, the hind wall 3 and the ceiling 4 form lattices out of which hens cannot stick their head and the bottom 5 forms a lattice out of which hens cannot stick their feet. The hens are introduced into the cage or withdrawn from the cage through a door provided in the ceiling 4, though the door is not shown in the figure.

The bottom 5 is inclined so that the front side 2 is slightly lower than the hind side, and a gap allowing passage of eggs is provided between the lower end of front net 2 and bottom 5. Owing to this structure, the eggs laid in cage 1 speedily roll out of cage 1 and gather in the dish 6 placed under the front net 2, so that they can be recovered without being crushed under the feet of the hens.

A feed container 7 is placed outside the front net 2, and a water container 8 is placed in a high position of cage 1. The hens residing in cage 1 can eat the feed from the feed container 7 after putting their head out of the front net 2 and can take water from the water container 8.

To each of the cages 1 other than that of the uppermost stage, namely to the cages 1 set on the second to fourth stages as counted up to down, a cage cover sheet 10 (hereinafter referred to as feces board) made of paper, unwoven fabric or the like is attached at the outside of each hind wall 3. The feces board 10 prevents the hens residing in the cages 1 of the lower stages (stages not upper than the stage to which the considered feces board is attached) from being soiled by the feces excreted from the hens residing in the cage 1 of upper stages, and at the same time conducts the falling feces to the floor 11 of the henhouse. The feces accumulating on the floor 11 (hereinafter referred to as feces floor 12) are disposed periodically, for example at intervals of one month.

Figure 2:
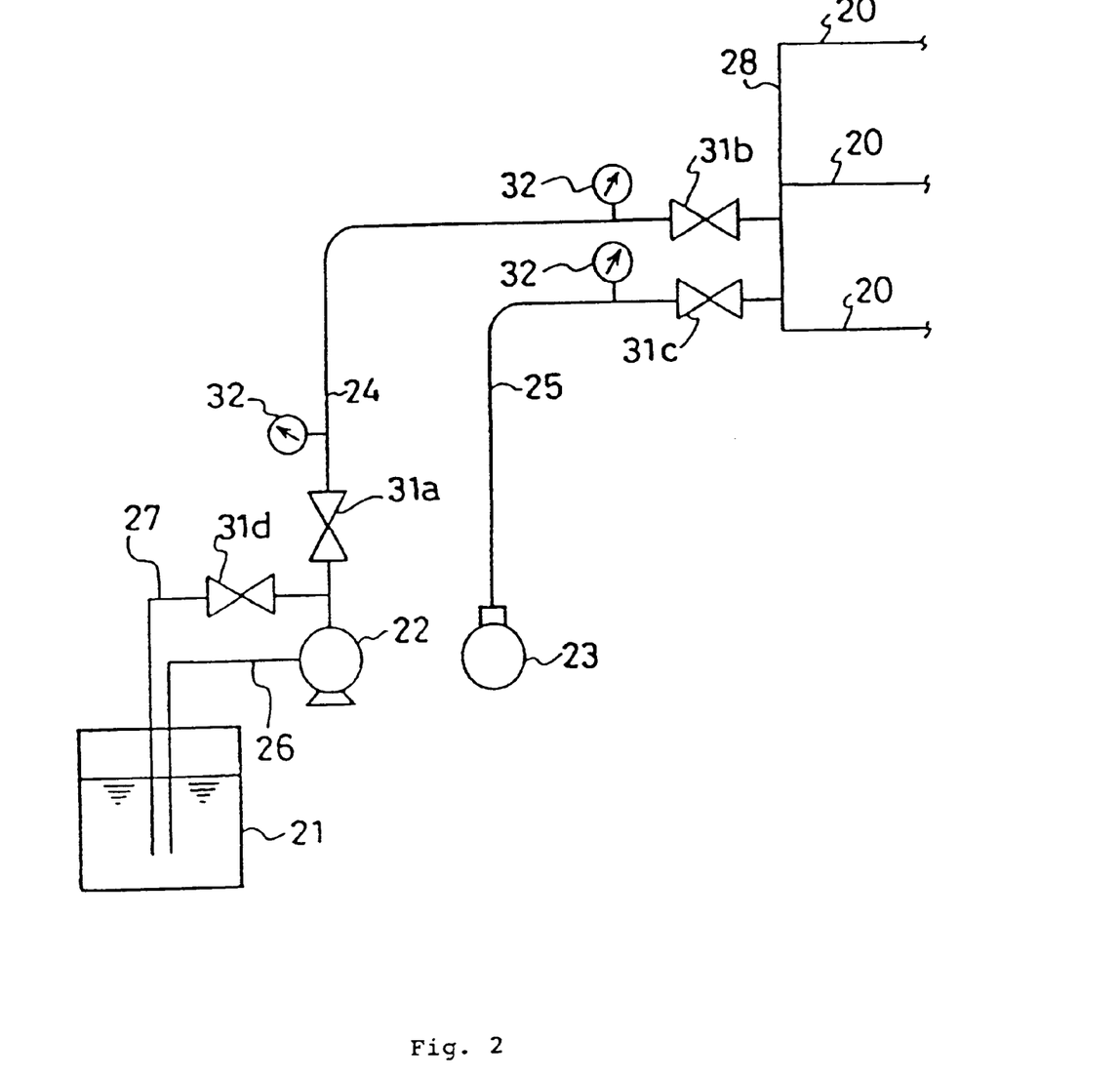
FIG. 2 is an outline of the above-mentioned pest-controlling apparatus for use in livestock barns.

As shown in FIG. 2, the pest-controlling apparatus for use in livestock barns (hereinafter simply referred to as controlling apparatus) of the present embodiment is so constructed as to spray a controlling agent for controlling pests such as housefly and the like onto the feces board 10 and feces floor 12 simultaneously and uniformly. The controlling apparatus is equipped with a plurality of spraying tubes 20—placed in prescribed positions of the henhouse, a tank 21 filled with a controlling agent diluted with water to a prescribed concentration (hereinafter simply referred to as agent), a pump 22 for sending with pressure the agent present in the tank 21 to the spraying tubes 20—, a compressor 23 for supplying compressed air to the spraying tubes 20—, an agent-supplying tube 24 connecting the pump 22 to the spraying tubes 20—, an air-supplying tube 25 connecting the compressor 23 to the spraying tubes 20—, a suction tube 26, a bypass tube 27, and branching tubes 28.

The agent-supplying tube 24 and the air-supplying tube 25 are connected to the spraying tubes 20—through intermediation of branching tubes 28. An agent-supplying means is constituted from tank 21, pump 22, agent-supplying tube 24, suction tube 26, etc., and an air-supplying means is constituted from compressor 23, air-supplying tube 25, etc.

Figure 3:
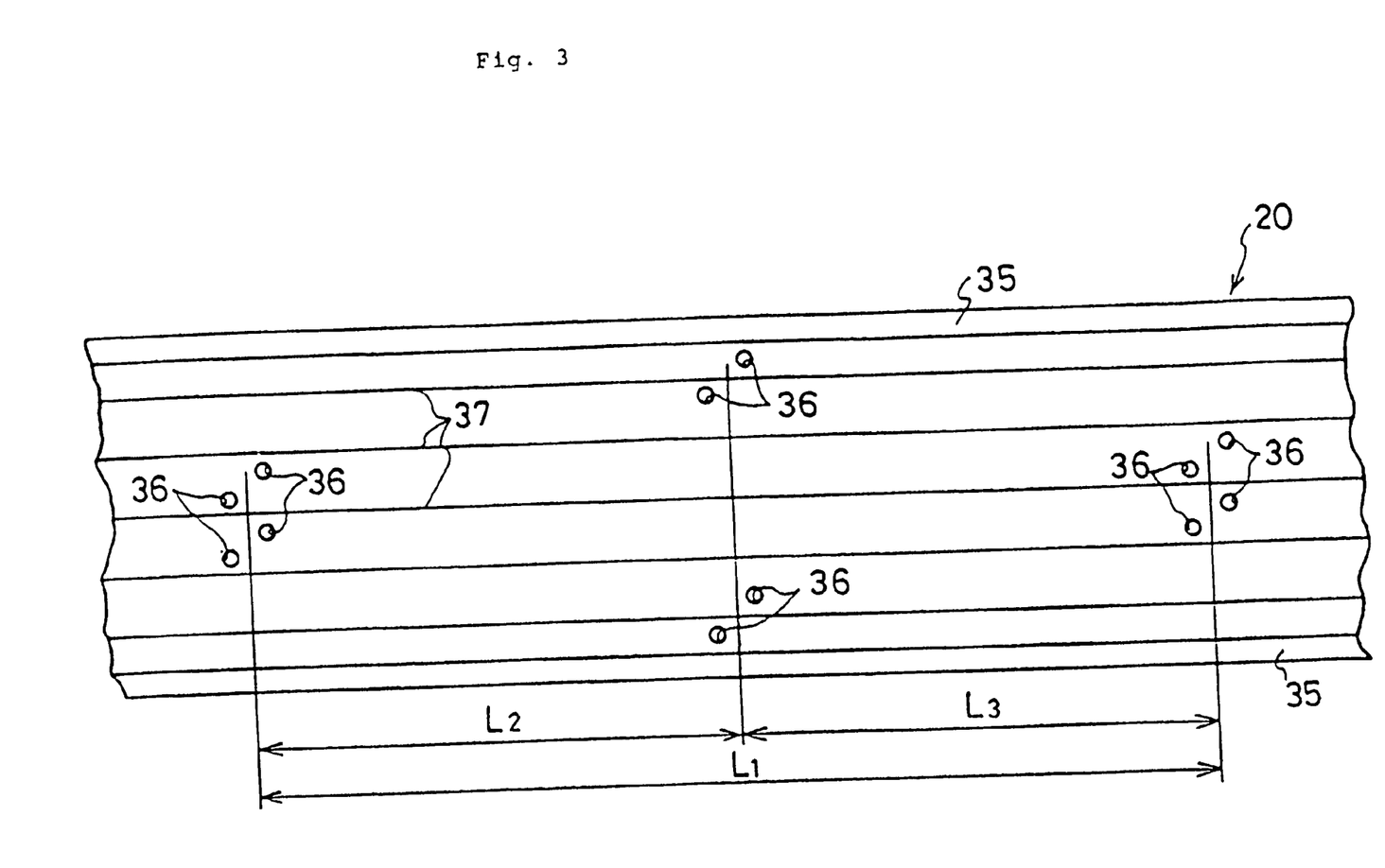
FIG. 3 is a side view of a spraying tube.

On the spraying tube 20, a number of spraying holes 36—are perforated in order to spray an agent (FIG. 3). A valve 31a is attached to the pump (22)-side terminal of the agent-supplying tube 24; a valve 31b is attached to the tube (20)-side terminal of the agent-supplying tube 24; a valve 31c is attached to the spraying tube (20)-side terminal of the air-supplying tube 25; and a valve 31d is attached to the pump (22)-side terminal of the bypass tube 27. Further, respective manometers 32 are provided in the neighborhoods of the valves 31a, 31b and 31c. Further, a strainer (not shown in the figure) is attached to the tank (21)-side terminal of the suction tube 26.

The tank 21, pump 22 and compressor 23 are placed out of the henhouse. The number of spraying tubes 20 is not critical, but it may be increased or decreased, for example, in accordance with the size of the henhouse.

The valves 31a to 31d are so constructed as to be opened or closed in accordance with the agent-spraying operation, namely spraying an agent, spraying no agent, supplying compressed air, etc. Thus, at the time of spraying an agent, valves 31a and 31b are open and valves 31c and 31d are closed. At the time of supplying compressed air, valve 31c is open and valve 31b is closed. The valve 31d attached to the bypass tube 27 is opened at the time of withdrawing the agent accumulating in the agent-supplying tube 24, and closed in the usual state. The valve 31b attached to the agent-supplying tube 24 and the valve 31c attached to the air-supplying tube 25 cannot be kept open simultaneously.

The pump 22 has an ability enough to send an agent to the whole space of spraying tubes 20—and spray the agent with a prescribed pressure. The compressor 23 has an air-compressing ability enough to supply compressed air to the spraying tubes 20—after sending the agent by means of pump 22, and to spray (discharge) the residual portion of the agent remaining in the spraying tubes 20—from the spraying holes 36—. Since compressed air is supplied to the spraying tubes 20 as above, no agent remains inside the spraying tubes 20—and the agent can be used effectively, and at the same time the clogging of the spraying holes 36—(FIG. 3) of the spraying tubes 20—, caused by the agent, can be prevented.

The agent-supplying tube 24 and the branching tube 28, as well as the air-supplying tube 25 and the branching tube 28, are connected to each other, respectively, by means of respective joints so that they can be loaded and unloaded at will. Thus, in case that a plurality of branching tubes 28 are prepared and the line is changed over as mentioned later, or in case that the spraying tubes 20—must be replaced with other ones, the agent supplying tube 24 and the air-supplying tube 25 can be separated from the branching tube 28 at the position of the joint, which makes it possible to carry out the change-over of line or replacement of spraying tubes 20—with a high efficiency.

As shown in FIG. 1, the spraying tubes 20—are appropriately placed in a position higher than the feces board 10 and not readily soiled by the feces, for example in a position just below the hind wall 3 of the cage. By placing the spraying tubes 20—in the above-mentioned position, the agent can be sprayed uniformly and efficiently, and at the same time the spraying holes 36—(FIG. 3) can be prevented from the clogging caused by the feces. Further, there is no risk of wetting the hens with the sprayed agent. The spraying tubes 20—are fixed on, for example, the wire constructing the hind wall 3 by means of tube-setting jigs which will be mentioned later.

As shown in FIG. 3, the spraying tube 20 is made of a thermoplastic synthetic resin such as polyethylene and the like which is superior in fatigue-resistant strength under repeated pressure and high in swelling resistance, heat resistance, cold resistance, tear resistance and impact resistance. The spraying tube 20 is formed by superposing two sheets of the above-mentioned synthetic resin and tightly bonding together their longitudinal sides, for example by the method of heat-sealing, over the whole length of the sheets to prepare a tube-form structure having side lugs 35,35. Thus, the spraying tube 20 swells at the time of spraying an agent to take the form of a cylinder, and it keeps flat in the period other than spraying. In one of the two sheets of film, a plurality of spraying holes 36—are perforated along the longitudinal axis of the tube.

Length and diameter of the spraying tube 20 are not particularly critical, but they may be designed with consideration of ability and pressure loss of the pump 22, number of spraying tubes connected to pump 22, the time period of spraying, the quantity of spraying, etc. so as to achieve a uniform spraying of the agent. For example, when spraying tubes 20—are placed in a henhouse having a length of 120 meters, the supply of agent to the whole of spraying tubes 20—will take a too long period of time to realize a uniform spraying of the agent if a spraying tube having a length of 120 meters is placed over the whole spread of the henhouse. In such a case, accordingly, it is advisable to place two spraying tubes 20, having a length of 60 meters respectively, from the two terminals of the henhouse toward the center of the henhouse. By taking such a measure, the period of time necessary for supplying the agent to the whole of spraying tubes 20 can be reduced to one half, so that a uniform spraying of the agent is achievable even if the spraying time is so short as several minutes.

The spraying holes 36—are so formed that the diameter is not smaller than 0.1 mm and not greater than 0.4 mm, preferably not smaller than 0.2 mm and not greater than 0.3 mm. The plurality of spraying holes may have an identical diameter or the diameters may vary with the position of perforation in spraying tube 20, namely with the spraying angle (mentioned later) which is dependent on the position of perforation. If the diameter of spraying hole 36—is smaller than 0.1 mm, the result is not good because the liquid drops projected from the spraying holes 36—have too small a size to be sprayed to a long distant place. If the diameter of spraying hole 36—is greater than 0.4 mm, the result is not good because the large size of the liquid drops causes an increased consumption of the agent and makes it impossible to spray the agent uniformly and efficiently.

The spraying holes 36—are distributed on the spraying tube 20 at equal intervals so that $L_1$ comes to about 5–40 cm and preferably 10–30 cm, wherein $L_1$ is the distance between two spraying holes 36,36 of the same kind, i.e. being equal in spraying angle which is dependent on the position of perforation on spraying tube 20. Such spraying holes 36 are perforated in a number of not less than 10 and not more than 60, preferably not less than 20 and not more than 50, per meter length of the spraying tube 20. If the number of spraying holes 36—per meter length of spraying tube 20 is less than 10, the result is not good because the quantity of liquid drops is small and total quantity of spray is insufficient. If the number of spraying holes 36—is more than 60, the result is not good because the quantity of liquid drops is too large and the total quantity of spray is excessively large.

Regarding other kinds of spraying holes 36 of which the spraying angle is different from the above, the 36—36 distances, namely $L_2$, $L_3$ are not critical. Needless to say, the distances $L_2$, $L_3$ may be identical or different from one another.

The spraying holes 36—are perforated to make a downward angle from the horizontal plane, namely to make a spraying angle of not smaller than 5 degrees and not greater than 90 degrees as measured downward from the horizontal plane. Accordingly, the agent is downward sprayed over the longitudinal length of spraying tube 20. By pre-setting the spraying angles at the spraying holes 36—to not smaller than 5 degrees and not greater than 90 degrees as measured downward from the horizontal plane, the liquid drops can be uniformly and efficiently sprayed onto feces boards 10 and feces floor 12. The concrete angles of the spraying holes 36—may be predetermined with consideration of the positions of spraying tube 20 and feces board 10 and the distance between them.

Since a spraying tube 20 is provided with protruding parts 37—and heat-sealed side lugs 35, 35 over its whole length and has an appropriate rigidity, the tube 20 cannot be twisted by liquid pressure or the like at the time of spraying an agent, but the angles mentioned above can be nearly exactly maintained at the time of spraying over the whole length of the tube.

Figure 4A:
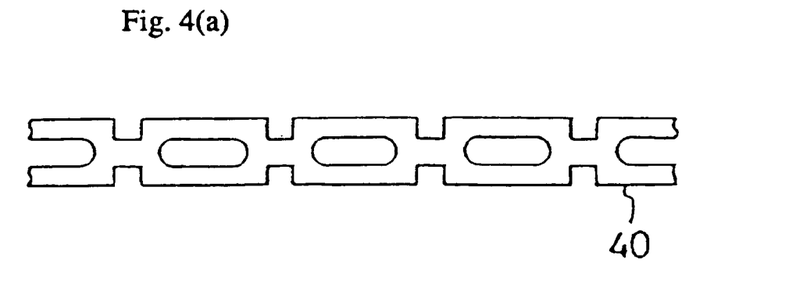
FIG. 4(a) is a front view of tape for fixing a spraying tube to a henhouse.
Figure 4B:
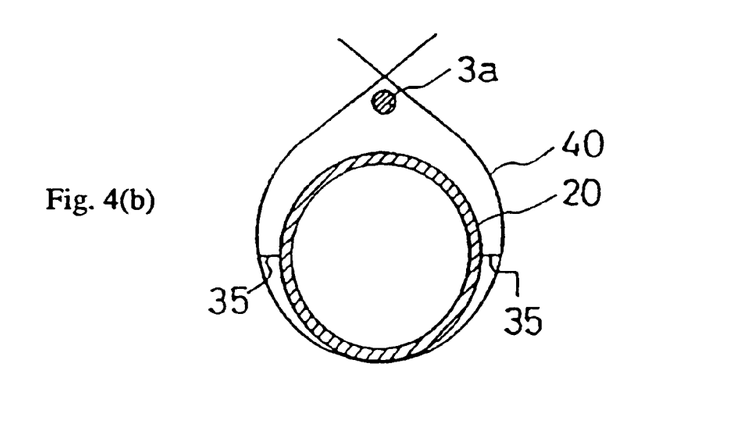
FIG. 4(b) is a sectional view of a spraying tube fixed with tape.
Figure 5A:
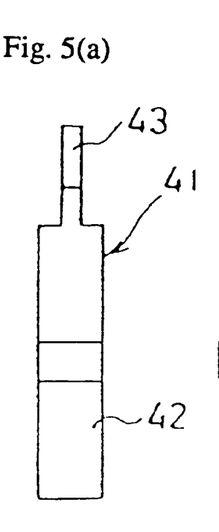
FIG. 5(a) is a front view of a hanger for fixing a spraying tube to a henhouse.
Figure 5B:
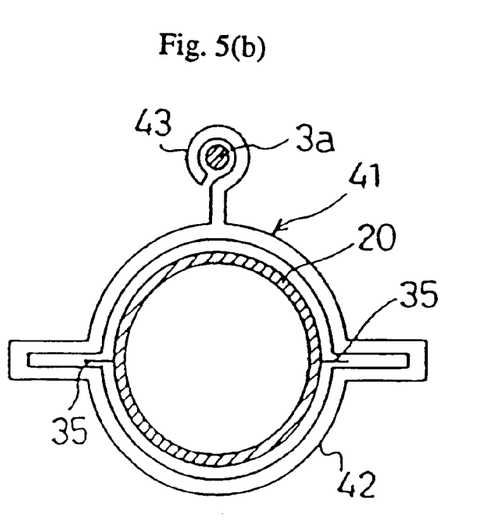
FIG. 5(b) is a sectional view of the state of a spraying tube fixed by means of a hanger.

The tube-setting jigs used for fixing the spraying tubes 20—to a henhouse are not particularly critical, so far as the shapes and qualities of the jigs make it possible to fix the spraying tubes 20—to prescribed positions of the henhouse without looseness or bending. For example, when a tape 40 made of a synthetic resin is used as the setting jig of the tube as shown in FIG. 4(*a*), spraying tube 20 is placed so that the side lugs 35, 35 exist in a horizontal plane and the spraying holes 36—look downward as shown in FIG. 4(*b*), tape 40 is wound around the spraying tube 20, and then both the terminal parts of tape 40 are fastened to wire 3a forming the hind wall 3 of the cage 1, for example, by which the spraying tube 20 can be fixed on the prescribed position of the henhouse. Otherwise, when a hanger 41 made of synthetic resin or metal is used as a setting jig of spraying tube 20 as shown in FIG. 5(*a*), spraying tube 20 is placed so that the spraying holes 36—look downward, the tube is passed through the insert 42 of the hanger 41, and then hook 43 of the hanger 41 is suspended from, for example, wire 3a of the cage, by which spraying tube 20 can be fixed to a prescribed position of the henhouse.

These tube-setting jigs may be attached at intervals of, for example, 150 cm, though the interval may be dependent on the setting conditions of spraying tube 20, too. When the tube-setting jigs are attached to wire 3a at the above-mentioned intervals, one tube-setting jig must stand a load of about 1.5 kg at the time of spraying an agent. Needless to say, the tube-setting jigs are not limited to those hanging the spraying tube 20, such as the tape 40 or the hanger 41.

The agent to be sprayed with the controlling apparatus of the above-mentioned construction is not particularly critical, so far as it can control pests such as housefly and the like. Specific examples of the agent include insect growth inhibitors and various insecticides such as Iodofenfos (for example, Nepolex (trade name) manufactured by Ciba-Geigy Japan, Ltd.), Pyriproxyfen (for example, Sumilab (trade name) manufactured by Sumitomo Chemical Co.) and the like.

Next, the procedure of spraying an agent using the controlling apparatus of the above-mentioned construction will be mentioned below.

First, tank 21 is filled with an agent, and valves 31a and 31b of agent-supplying tube 24 are opened and valve 31c of air-supplying tube 25 and valve 31d of bypass tube 27 are closed. Then, pump 22 is driven to send with pressure the agent present in tank 21 to spraying tubes 20—via the suction tube 26, agent-supplying tube 24 and branching tube 28. By this procedure, the agent is projected from the spraying holes 36—provided on the spraying tubes 20—, and sprayed to feces boards 10—and feces floor 12 uniformly and simultaneously.

When a predetermined quantity of the agent has been sprayed, the pump 22 is stopped, valve 31b is closed and valve 31d is opened. By this procedure, the agent remaining in the agent-supplying tube 24 and the excessive agent which has been sent before the complete stop of pump 22 are returned to tank 21.

Just at the same time as the time of closing valve 31b, compressor 23 is driven and valve 31c of air-supplying tube 25 is opened. By this procedure, compressed air is supplied to spraying tubes 20—, and the residual agent remaining in the spraying tubes 20—is discharged from the spraying holes 36—. Owing to this procedure, no residual agent remains in the spraying tubes 20—and the agent can be used effectively, and at the same time the spraying holes 36—provided on spraying tubes 20—can be prevented from the clogging caused by the agent. Thereafter, compressor 23 is stopped and valve 31c is closed to complete the agent-spraying work. The times at which pump 22 and compressor 23 are driven or stopped are not particularly critical.

Next, a concrete example of agent-spraying work using a controlling apparatus according to the above-mentioned construction will be explained below. In the concrete examples mentioned below, six tubes made of Sumisansui R (trade name of a product manufactured by Sumitomo Chemical Co.) having a length of 60 meters were used as the spraying tubes 20—per henhouse, and each branching tube 28 was connected to three spraying tubes 20—to make two lines. Each of the two lines was set in a prescribed position of a chick type four-stage windowless henhouse having a frontage width of 120 meters and a floor depth (depth of floor 11) of 2.23 meters so that the two lines were directed from both terminals of the henhouse to its center. Five henhouses in which the lines were set in the above-mentioned manner were prepared in the total. That is, thirty spraying tubes 20 were used in the total to prepare ten lines.

Per meter length of each spraying tube 20, forty spraying holes 36 were provided. The diameter of spraying holes 36—was 0.2 mm. In order to spray the agent uniformly, four spraying angles of 14 degrees, 34 degrees, 60 degrees and 80 degrees were adopted as measured downward from the horizontal plane. Among the spraying holes 36—, those having an identical spraying angle were separated from one another at 36, 36 intervals $L_1$ of 20 cm, and spraying holes of different spraying angles were separated from one another at 36, 36 intervals $L_2$, $L_3$ of at most 10 cm. By pre-setting the pressure of pump 22 to 0.5 $kg/cm^2$, the apparatus was regulated so as to spray 0.45 liter, on the average, of the agent per minute per meter length of spraying tube 20.

As expressed in terms of total amount to be sprayed onto feces boards 10—and feces floor 12, the agent had to be sprayed in an amount of one liter per treatment per square meter of the floor (11) surface. Accordingly, the amount of agent sprayed per line was equal to:

1×2.23×60≈134 liters and the period of time necessary for spraying the above-mentioned amount of agent was equal to:

134/(0.45×60×3)≈1.65 minutes (about 1 minute and 40 seconds)

When an agent-spraying work was practiced under the above-mentioned spraying conditions, the spraying time per line was 4 minutes. Said spraying time included the following times:

The time necessary for spraying the agent: 1 minute and 40 seconds

The time necessary for spraying the residual agent remaining in the spraying tube: 1 minute The time necessary for changing over the line: 1 minute and 20 seconds The total spraying time required for spraying the agent to all of the five henhouses was 80 minutes. Said total spraying time could be subdivided into the following:

The time necessary for preliminary arrangement of spraying such as compounding of agent, etc.: 40 minutes The time necessary for spraying (4 minutes×10 lines): 40 minutes.

With the above-mentioned controlling apparatus, the work staffs could spray an agent by a simple and easy work such as a mere change-over of line, without stepping into the henhouse at the time of spraying the agent. By using the controlling apparatus, labor power could be saved because the spraying work could be accomplished with only two working staffs.

Next, as a comparative example, a case of spraying an agent using a prior power-driven spraying apparatus will be mentioned below. The power-driven spraying apparatus used herein was provided with a tank and a pump placed out of the henhouse and a hose made of synthetic rubber or the like, and so constructed as to send with pressure the agent present in the tank into the pressure-resistant hose by means of the pump. A working staff stepped into the henhouse with the nozzle attached to the tip of the hose in his hands to spray the agent onto feces boards 10—and feces floor 12.

When an agent was sprayed with the above-mentioned prior power spraying apparatus under nearly the same spraying conditions as those for the controlling apparatus of the invention, the time period of spraying was one hour per henhouse. The total spraying time necessary for spraying all of the five henhouses was 5 hours and 30 minutes, which included the period of time necessary for compounding of the agent, preliminary arrangement of the spraying work, etc. (30 minutes), too.

In the above-mentioned prior power-driven spraying apparatus, the working staff had to spray the agent while dragging and conducting the pressure-resistant hose. Further, since the feces boards 10—were placed inside the henhouse so as to face one another, the working staff had to step into the henhouse in order to spray the agent onto these feces boards 10—. This made a uniform spraying work quite difficult to carry out and made the working environment very hard. Further, three working staffs were necessary for carrying out the spraying work.

As has been mentioned above, the pest-controlling apparatus for use in livestock barns of the present invention is so constructed that spraying tubes 20—through which a plurality of spraying holes 36—are perforated along the longitudinal axis of the tube are placed in the position upper than the feces boards 10—of the henhouse, the spraying tubes 20—are connected with a tank 21 for supplying an agent, a pump 22, an agent supplying means including an agent-supplying tube 24, a suction tube 26, etc., and an air-supplying means including a compressor 23 for supplying compressed air, an air-supplying tube 25, etc.

Owing to the above-mentioned construction, an agent can be sprayed uniformly and simultaneously onto feces boards 10—and feces floor 12, and therefore the eggs of pests adhering to feces boards 10—and those laid on feces floor 12 can be controlled certainly. Accordingly, pests can be efficiently and certainly controlled with the above-mentioned pest-controlling apparatus for use in livestock barns.

Further, since compressor 23 supplies compressed air to spraying tubes 20—, no residual agent remains in the spraying tubes 20—, and the agent can be used up effectively and the clogging of spraying holes 36—caused by the agent can be prevented.

Since the spraying tubes 20—are provided with not less than 10 and not more than 60 spraying holes 36—per meter length and the spraying holes 36—have a diameter of not smaller than 0.1 mm and not greater than 0.4 mm and the angles of the spraying holes 36—at the time of spraying an agent are so designed as to be not smaller than 5 degrees and not greater than 90 degrees as measured downward from the horizontal plane, an appropriate quantity of agent can be sprayed onto feces boards 10—and feces floor 12 further uniformly and certainly.

In the example presented above, a case of placing a pest-controlling apparatus for use in livestock barns of the invention in a henhouse was mentioned. Needless to say, the pest-controlling apparatus for use in livestock barns of the invention can be placed in a pig house, a cow shed, etc., too, by which pests such as housefly and the like can be controlled efficiently and certainly by spraying an agent onto feces of pig, cow, etc. uniformly and certainly.

As has been mentioned above, the pest-controlling apparatus for use in livestock barns according to claim 1 of the present invention is a pest-controlling apparatus for use in livestock barns which controls pests by spraying an agent to feces of livestock, and the apparatus is so constructed that spraying tubes through each of which a plurality of spraying holes are perforated along the longitudinal axis of the tube are placed in prescribed positions of the livestock barn and the spraying tubes are provided with agent-supplying means for supplying an agent to the spraying tubes and air-supplying means for supplying compressed air to the spraying tubes.

This construction makes it possible to spray an agent to desired parts of alivestock barn uniformly and certainly and thereby to control pests efficiently and certainly. Further, since compressed air is supplied to the spraying tubes, no residual agent remains in the spraying tubes and the agent can be used up effectively and, at the same time, there can be exhibited an effect of preventing the spraying holes from clogging of spraying holes caused by the agent.

As has been mentioned above, the pest-controlling apparatus for use in livestock barns according to claim 2 of the present invention is a pest-controlling apparatus for use in livestock barns which is placed in a chick type multi-stage windowless henhouse as a livestock barn and controls pests by spraying an agent to feces of hens, and this apparatus is so constructed that spraying tubes through each of which a plurality of spraying holes are perforated along the longitudinal axis of the tube are placed at prescribed positions upper than the cage cover sheet of the henhouse and the spraying tubes are provided with agent-supplying means for supplying an agent to the spraying tubes.

This construction exhibits an effect of making it possible to spray an agent to desired parts of a henhouse such as cage cover sheet, etc. uniformly and certainly and thereby to control pests efficiently and certainly.

As has been mentioned above, the pest-controlling apparatus for use in livestock barns according to claim 3 of the present invention has a construction that not less than 10 and not more than 60 spraying holes are perforated per meter length of spraying tube, the spraying holes have a diameter of not smaller than 0.1 mm and not greater than 0.4 mm and the angles of the spraying holes at the time of spraying an agent are not smaller than 5 degrees and not greater than 90 degrees as measured downward from the horizontal plane.

This construction makes it possible to spray an appropriate quantity of agent to desired parts of a henhouse such as cage cover sheet, etc. further uniformly and certainly.

We claim:

1. A spraying apparatus for pest control comprising
   1) a plurality of spraying tubes each of which is perforated along the longitudinal axis thereof;
   2) pest-control agent-supplying means affixed to said spraying tubes; and
   3) suspending means whereby said apparatus is positioned above the higher of a feces floor or a feces board
      wherein each of said tubes is perforated by 10–60 holes per meter along said longitudinal axis,
      wherein each of said holes is 0.1–0.4 mm in diameter and, at the time of spraying, forms an angle of 5–90 degrees as measured downward from the horizontal plane.

2. A spraying apparatus for pest control comprising
   1) a plurality of spraying tubes each of which is perforated along the longitudinal axis thereof;
   2) pest-control agent-supplying means affixed to said spraying tubes;
   3) suspending means whereby said apparatus is positioned above the higher of a feces floor or a feces board; and
   4) compressed-air supplying means affixed to said spraying tubes
      wherein each of said tubes is perforated by 10–60 holes per meter along said longitudinal axis.
      wherein each of said holes is 0.1–0.4 mm in diameter and, at the time of spraying, forms an angle of 5–90 degrees as measured downward from the horizontal plane.

3. A method for controlling pests which comprises applying to a feces floor or a feces board a pest-control agent with a spraying apparatus which comprises
   1) a plurality of spraying tubes each of which is perforated along the longitudinal axis thereof;
   2) pest-control agent-supplying means affixed to said spraying tubes;
   3) suspending means whereby said apparatus is positioned above the higher of a feces floor or a feces board; and
   4) compressed-air supplying means affixed to said spraying tubes
      wherein each of said tubes is perforated by 10–60 holes per meter along said longitudinal axis,
      wherein each of said holes is 0.1—0.4 mm in diameter and, at the time of spraying, forms an angle of 5—90 degrees as measured downward from the horizontal plane.

* * * * *